UNITED STATES PATENT OFFICE.

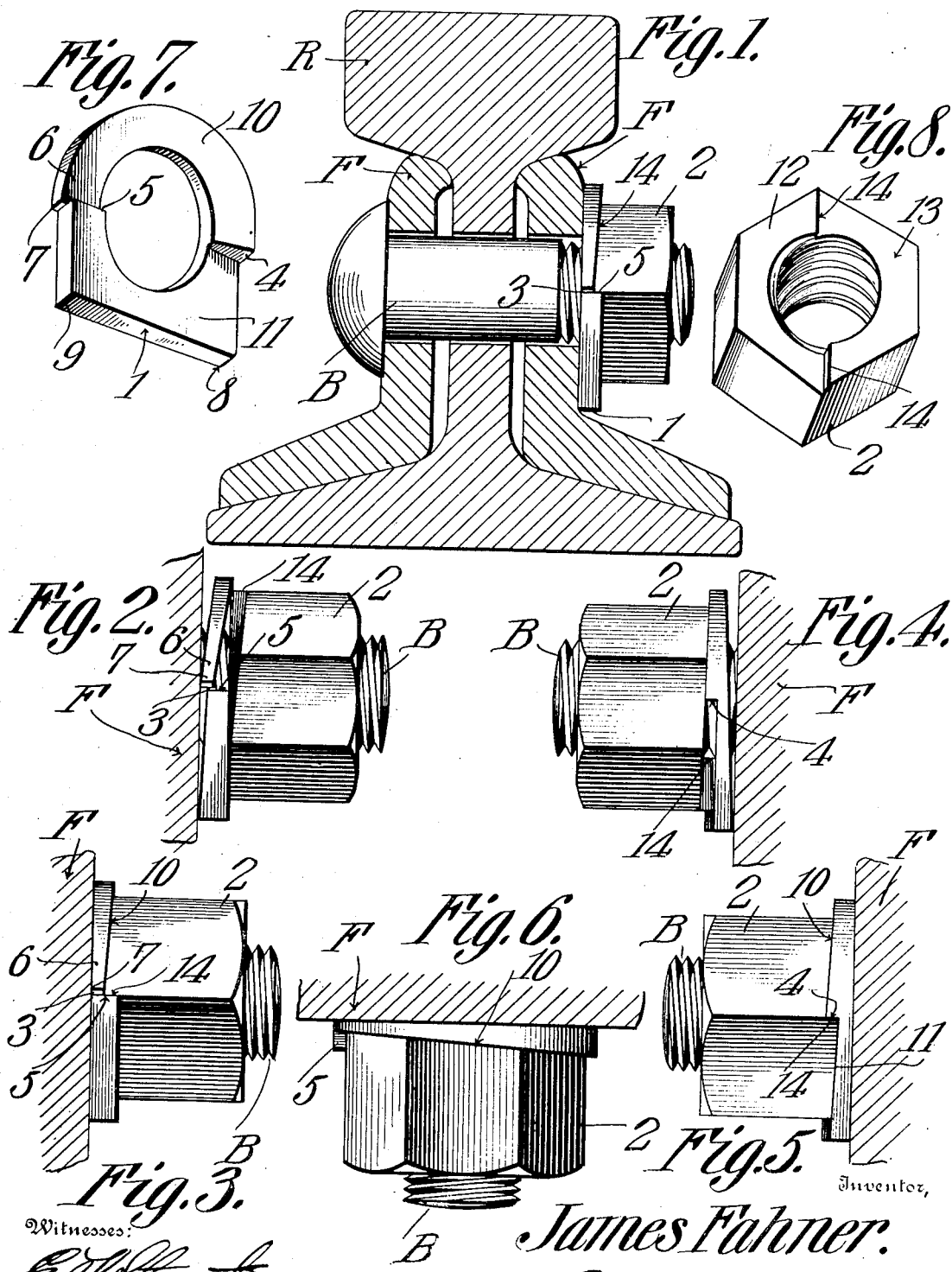

JAMES FAHNER, OF COLUMBUS, OHIO.

NUT-LOCK.

No. 912,657.  Specification of Letters Patent.  Patented Feb. 16, 1909.

Application filed March 23, 1908. Serial No. 422,749.

*To all whom it may concern:*

Be it known that I, JAMES FAHNER, a citizen of the United States, residing at Columbus, in the county of Franklin and State of Ohio, have invented a new and useful Nut-Lock, of which the following is a specification.

This invention relates to nut locks.

The object of the invention is, in a novel and practical manner, so to secure the locking of the nut on the bolt as positively to preclude the possibility of the former working loose on the latter under any conditions of use.

With the above and other objects in view, as will appear as the nature of the invention is better understood, the same consists, generally stated, in a washer having a radial cleft extending from its opening through its perimeter, and a pair of reversely arranged shoulders disposed in alinement with the cleft, one portion of the washer adjacent to the cleft being deflected away from the adjacent shoulder to provide one of a pair of fish plate engaging members, the other of which is formed by the corner of the washer disposed diagonally to the cleft.

The invention further consists in the combination with a locking washer such as defined, of a nut having one face provided with a pair of alined shoulders that are oppositely inclined relatively to the plane of the said face and are adapted to interlock with the shoulders of the washer, thus to hold the nut positively against movement on the bolt.

The invention consists, further, in various novel details of construction of a nut lock, as will be hereinafter fully described and claimed.

In the accompanying drawings forming a part of this specification, and in which like characters of reference indicate corresponding parts, Figure 1 is a view in vertical transverse section through a railway rail and the applied fish plates, displaying the nut lock of the present invention assembled with a bolt. Fig. 2 is a view in side elevation, displaying the nut lock before the nut is tightened. Fig. 3 is a similar view, taken from the same side of the device, and displaying the nut lock after the nut has been tightened. Fig. 4 is a similar view taken from the opposite side of the nut to that shown in Figs. 2 and 3, and displaying the nut lock before the nut is tightened. Fig. 5 is a similar view, taken from the same side of the device, and displaying the nut lock after the nut has been tightened. Fig. 6 is a top plan view, showing the nut lock as it appears when the nut is tightened. Fig. 7 is a perspective detail view of the locking washer. Fig. 8 is a similar view of the nut.

Referring to the drawings, R designates an ordinary railway rail, F the fish plates, and B the bolt, that forms one of a series (not shown) for holding the fish plates and rail assembled. As these parts may be of the usual, or any preferred, construction, further description is deemed unnecessary.

The novelty of the present invention resides in the peculiar form of locking washer which is shown in detail in Fig. 7. This washer is approximately semi-circular, when viewed in elevation, the flat side 1 of which is designed to bear against the base of the fish plate to hold the former against turning, when the nut 2 is being turned to its seat.

The washer is provided with a radial cleft 3 that extends from the bolt opening entirely through its perimeter, and one face of the washer, which will be the outer one in use, is formed with two nut locking shoulders 4 and 5 that are arranged in alinement with the cleft. The shoulders are formed by cutting away or beveling the said face of the washer in opposite directions relatively to the plane of the face, as clearly shown in Fig. 7, and the portion 6 of the washer is deflected away from the shoulder 5 to provide one fish plate engaging member 7 of a pair, the other one 8 being formed by the corner of the washer diagonally opposite the cleft. The provision of these two members 7 and 8 causes the portion of the washer from the corner 9 to the shoulder 5, and practically all of the remaining portion of the washer from the point or member 7 to the point or member 8, to be out of contact with the fish plate before the nut is tightened, as clearly shown in Figs. 2 and 3. This construction of the washer will cause the nut engaging faces 10 and 11, which, as above stated, are oppositely beveled or inclined, to impinge closely against the oppositely inclined or beveled washer engaging faces 12 and 13 of the nut, and secure an intimate union between the two that will preclude any rocking or movement of the washer, even when the nut is only slightly tightened. The cutting away of the nut, to provide the faces 12 and 13, forms two shoulders 14 that are adapted to interlock with the shoulders 4 and 5 of the washer, as clearly shown in Figs. 4 and 5, and thus positively secure the nut in position. As will be obvious, the washer will be made of resilient metal, and the portion 6 will always cause it to exert an outward pressure against the nut and thus accentuate the locking feature.

As shown in Fig. 1 of the drawings, when the nut 2 is tightened upon the bolt, the portion 6, and in fact the entire washer, will be flattened against the fish-plate, so that that face of the washer other than the face upon which the shoulder 4 is formed, will bear flat against the outer face of the adjacent fish-plate.

For sake of convenience, the object against which the washer bears is described as a fish plate, but it is to be understood that the washer is adapted for use in any position where found of advantage.

The improvements herein defined, while simple in character, will be found thoroughly efficient for the purposes designed, and will secure the objects sought in a positive manner.

I claim:—

The combination with a bolt, of a washer having a portion of its perimeter straight to present two corners, and provided with a radial cleft extending from its bolt opening through its perimeter, and with one of its faces furnished with oppositely inclined surfaces that define a pair of reversely arranged shoulders disposed in alinement with the cleft, one portion of the washer adjacent to the cleft being deflected away from the contiguous shoulder to provide one of a pair of members to impinge against the object to be clamped, the other of which is formed by the corner of the washer disposed diagonally to the cleft, and a nut having one face provided with a pair of oppositely inclined surfaces to coact with those of the washer and also provided with a pair of alined shoulders to interlock with those of the washer, that face of the washer disposed against the object to be clamped, being flat throughout its entire extent when the nut is seated.

In testimony that I claim the foregoing as my own, I have hereto affixed my signature in the presence of two witnesses.

JAMES FAHNER.

Witnesses:
E. W. CADY,
C. E. DOYLE.